UNITED STATES PATENT OFFICE.

J. P. THOMPSON, OF KIRKVILLE, IOWA.

IMPROVED COMPOSITION FOR ROOFING.

Specification forming part of Letters Patent No. 57,989, dated September 11, 1866.

*To all whom it may concern:*

Be it known that I, J. P. THOMPSON, of Kirkville, in the county of Wapello and State of Iowa, have invented a new and useful composition of matter—viz., a Composition for Covering the Roofs of Buildings and for other similar purposes; and I do hereby declare that the following is a full, clear, and exact description of the mode of compounding and applying the same.

The following description will enable any person skilled in the art to compound and apply the same.

Take of raw coal-tar, one gallon; of pulverized anthracite coal, twenty-five pounds; of white or potters' clay, twelve and a half pounds; of slaked lime, twelve and a half pounds. Stir these ingredients into the tar until thoroughly mixed and brought to the consistency of a thick paste, and then apply with a trowel or other suitable implement to the roof, which should be covered with the ordinary felting-paper; or it may be applied to cover the shingles or boards.

The proportions here stated are not absolutely fixed, but may be changed, according to circumstances, when found expedient.

What I claim as my invention, and desire to secure by Letters Patent, is—

A composition of matter compounded and prepared substantially as and for the purpose set forth.

In testimony whereof I have signed my name to this specification in the presence of two subscribing witnesses.

J. P. THOMPSON.

Witnesses:
SAMUEL McCOLLOUGH,
DAVID McCOLLOUGH.